May 3, 1932. G. R. WHITNALL 1,856,677
MATERIAL HANDLING MACHINE
Filed Aug. 8, 1928 2 Sheets-Sheet 2
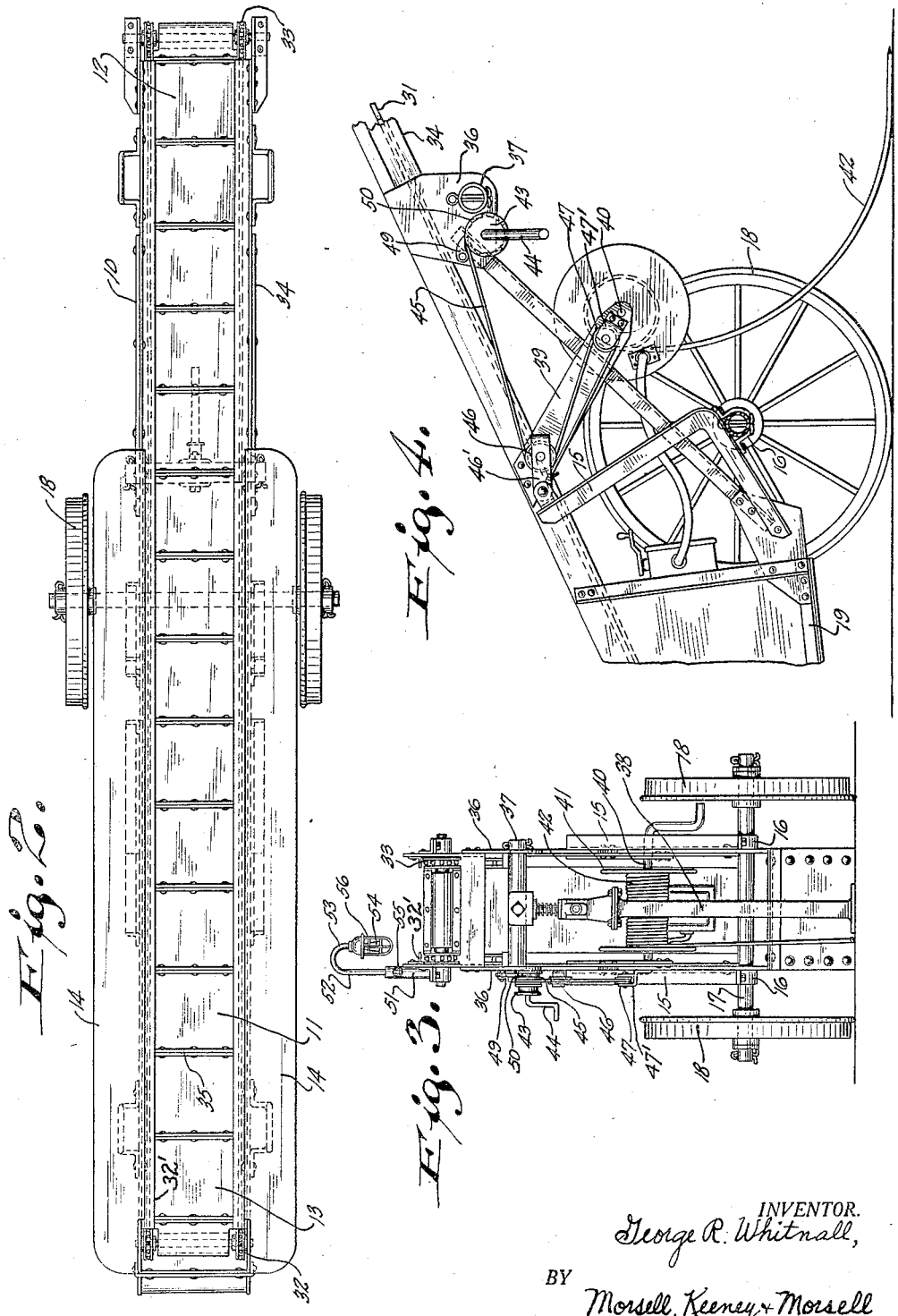
INVENTOR.
George R. Whitnall,
BY
Morsell, Keeney & Morsell
ATTORNEYS Patented May 3, 1932

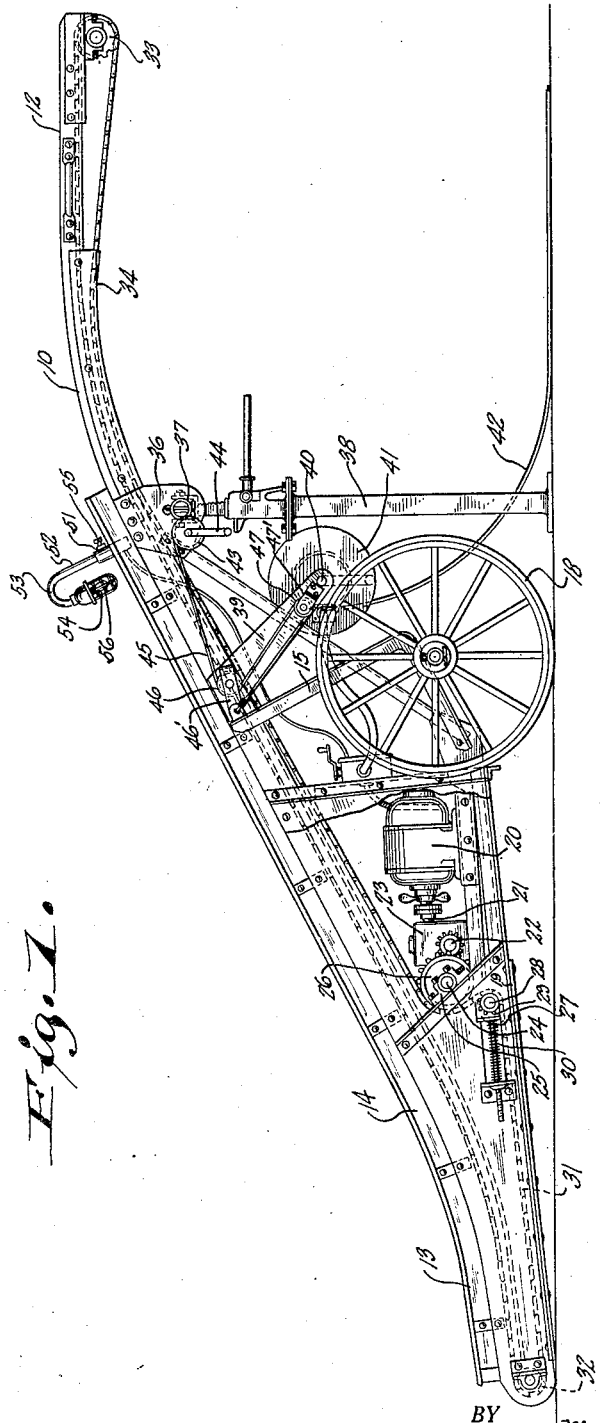

1,856,677

UNITED STATES PATENT OFFICE

GEORGE R. WHITNALL, OF JANESVILLE, WISCONSIN, ASSIGNOR TO NORTHERN CONVEYOR & MFG. CO., OF JANESVILLE, WISCONSIN, A CORPORATION OF WISCONSIN

MATERIAL HANDLING MACHINE

Application filed August 8, 1928. Serial No. 298,285.

This invention relates to improvements in material handling machines, and is more particularly adapted to a mine car loading device.

It is one of the objects of the present invention to provide a material handling machine which is adapted to be used within the veins of mines for conveying and loading material on to mine cars, the machine being designed and constructed so that it may be operated with efficiency and moved in cramped and confined quarters.

A further important object of this invention is to provide a material handling machine of the type described in which the conveyor frame portion is provided with a substantially horizontal loading end to facilitate the placing of material therein.

It is a further object of this invention to provide a material handling machine having an improved means for adjusting the conveyor on the truck, the said means being adapted to provide leverage for adjusting the height of the discharge end with the minimum amount of effort on the part of the operator.

A further object of this invention is to provide a material handling machine having means in connection therewith for illuminating the space around the machine, which is particularly necessary in using the device in mines.

It is a further object of this invention to provide a material handling machine which is simple in construction, light in weight, and well adapted for the purpose described.

With the above and other objects in view the invention consists of the improved material handling machine and all its parts and combinations as set forth in the claims and all equivalents thereof.

In the accompanying drawings, in which the same reference characters indicate the same parts in all of the views:

Fig. 1 is a side view of the material handling machine, part being broken away to show the motor and driving means;

Fig. 2 is a plan view thereof;

Fig. 3 is a view of the discharge end of the machine; and

Fig. 4 is an enlarged detail view showing the improved means for adjusting the conveyor on the truck, parts being broken away.

Referring to the drawings, the numeral 10 designates a conveyor portion which comprises a trough member 11 normally positioned at an incline. The said conveyor member and trough have a discharge end 12 and a loading end 13. The shape of the conveyor and trough are novel, in view of the fact that the loading end 13 is substantially horizontal. This end may be of any desired length, the main object being to provide a portion of the trough which is substantially parallel to the ground so that material loaded therein will not slide back by the force of gravity. From the loading end the conveyor frame and trough incline upwardly, as shown clearly in Fig. 1, to the discharge end where they again extend in a substantially horizontal direction. The conveyor frame is provided at its side portions with outwardly extending and upwardly inclined flanges 14 which are adapted to receive any surplus material which might be loaded into the receiving end and direct said material to the trough.

The conveyor frame and trough are mounted on a truck frame which comprises frame members 15 having bearing portions 16 within which an axle 17 carrying a pair of flanged wheels 18 is journaled. A motor supporting frame 19 extends downwardly from the loading end of the conveyor and supports an electric motor 20 having a drive shaft 21 which is adapted to rotate a gear 22 by means of gears (not shown) within the gear housing 23.

The gear 22, through another gear not shown, is adapted to rotate the shaft 24 which is journaled in bearings 25 mounted on opposite sides of the motor supporting frame. The shaft 24 carries a pair of sprocket wheels 26. Journaled in bearings 27 is a second shaft 28 carrying at its end portions small sprocket wheels 29. The said bearings 27 are adjustable by means of the adjustment member 30 to tighten a pair of spaced-apart endless chains 31 which pass under the sprocket wheels 28.

The said endless chains 31 extend from the sprocket wheels 28 toward the loading end of the conveyor and pass around sprocket wheels 32 and up over the top of the trough traveling beneath the guiding flange 32' to the discharge end, where they pass around sprocket wheels 33. From there the chains pass through guiding flanges 34 down to and around one side of the sprocket wheels 26, the latter wheels driving the chains.

Positioned between the spaced-apart endless chains and secured at each end thereto are a plurality of flight members 35 which are adapted to engage material to carry it along the trough.

Projecting downwardly from side portions of the conveyor frame are brackets 36 between which a shaft 37 extends. Carried by said shaft is the upper end of a jack 38, said jack having a universal joint connection with said shaft to permit the machine to be jacked up off of its wheels with its lower end resting upon the ground and swung to a desired position when putting it on to or removing it from tracks or for moving it short distances.

Projecting from a medial portion of the conveyor frame is a pair of arms 39 between the lower ends of which a shaft 40 extends. Rotatably mounted on the shaft is a cable reel 41. A cable 42 is wound on the reel, one end of the cable being in connection with the electric motor 20 and the other end being connected to a distant source of electric power (not shown).

An important feature of the device resides in the means for tilting the conveyor frame on the truck. This means comprises a drum 43 which is rotatably mounted on one of the brackets 36. A crank handle 44 is connected with said drum and by turning said handle a rope or cable 45, one end of which is attached to the drum 43, may be wound about said drum. The said cable 45 passes around a pulley 46 rotatably mounted in a block 46' which is pivoted to an end of the frame member 15. From there the cable passes around a pulley 47 rotatably mounted in a block 47' secured to the lower end of the arm 39. The end of the cable is secured to the upper end of the frame member 15. The frame member 15 is L-shaped, its lower end being secured to the end of the motor supporting frame 19. By turning the crank handle 44 the cable is wound on the drum 43 and the device may be thus adjusted so that its discharge end is at various distances from the ground. By providing the drum 43 and the pulleys 46 and 47, a powerful leverage is obtained which permits raising and lowering the conveyor frame with the minimum amount of effort. The conveyor frame may be maintained in any adjusted position by means of the dog 49 engaging a ratchet 50 in connection with the drum 43.

A bearing 51 connected to the conveyor frame has extending therein an arm 52 having a curved upper end 53. Extending downwardly from the curved upper end is a lamp 54. The arm 52 is adjustable in the bearing 51 by means of the set screw 55, so as to vary the height of the electric lamp. The lamp is covered by a guard 56 to prevent breakage. By means of this lamp the workmen are furnished with the proper light conveniently positioned for their purpose.

It is to be understood that the conveyor trough may be of any desired width, according to the uses to which it is to be put. Furthermore, the length of the substantially horizontal loading end 13 may be varied to meet different requirements.

When the motor is set into operation, through the above described driving means, the endless chains are driven and material which is loaded into the horizontal lower end is carried upwardly along the trough by the flights 35 and discharged from the upper outer end portion into cars or other receptacles. The substantially horizontal lower end greatly facilitates loading of material into the conveyor, as before pointed out. When it is desired to vary the height of the discharge end for cars of different heights this may be readily accomplished through the novel adjustment means above described.

All structural members of the machine, and all plates and sheets are constructed preferably of aluminum to render the device light in weight so that it may be handled more easily in the cramped passageways of mines.

From the foregoing description it will be seen that the improved material handling machine is simple in construction, strong and durable, and well adapted for the purpose described.

What I claim is:

1. A material handling machine, comprising an inclined conveyor frame having a lower material receiving end and an upper discharge end; means for moving material upwardly on said conveyor frame; supporting means pivotally connected to the conveyor frame intermediate its ends; a drum rotatably mounted on the conveyor frame; an arm extending from said conveyor frame; a pulley rotatably mounted on the lower end of said arm; a pulley block pivoted to a portion of the supporting means; a pulley rotatably carried by said pulley block; a cable having one end secured to said supporting means, said cable passing around the pulley mounted on the lower end of said arm, around the pulley connected to the supporting means, and to said drum, the conveyor frame being adjustably tiltable on the supporting means to vary the height of the discharge end of the conveyor frame by the rotation of said drum; and means for maintaining said conveyor frame in any adjusted position.

2. A material handling machine comprising an inclined conveyor frame having a lower material receiving end and an upper discharge end, means for moving material upwardly on said conveyor frame, supporting means pivotally connected to the conveyor frame intermediate of its ends, an arm extending from said conveyor frame, a pulley rotatably mounted on the lower portion of said arm, a pulley rotatably mounted on a portion of the supporting means, a cable having one end secured to said supporting means, said cable passing around the pulley mounted on the lower portion of said arm and around the pulley on the supporting means, and means for exerting a pull on the free end of said cable to cause tilting of the conveyor frame on the supporting means.

In testimony whereof, I affix my signature.

GEORGE R. WHITNALL.